(12) United States Patent
Fujiwara

(10) Patent No.: US 6,669,548 B2
(45) Date of Patent: Dec. 30, 2003

(54) INSIDE/OUTSIDE AIR SWITCHING DEVICE WITH ROTARY DOOR, AND VEHICLE AIR CONDITIONER USING THE SAME

(75) Inventor: Kenya Fujiwara, Higashiura-cho (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/354,757

(22) Filed: Jan. 30, 2003

(65) Prior Publication Data

US 2003/0143941 A1 Jul. 31, 2003

(30) Foreign Application Priority Data

Jan. 31, 2002 (JP) ........................................ 2002-023867

(51) Int. Cl.[7] ................................................. B60H 1/00
(52) U.S. Cl. ........................ 454/143; 454/121; 165/41
(58) Field of Search ..................... 237/12.3 B; 165/41, 165/42; 454/121, 119, 143

(56) References Cited

U.S. PATENT DOCUMENTS

| | | | | |
|---|---|---|---|---|
| 5,967,890 A | * | 10/1999 | Loup et al. | ................. 454/121 |
| 6,113,483 A | * | 9/2000 | Schambre et al. | ........... 454/121 |
| 6,270,400 B1 | * | 8/2001 | Tsurushima et al. | ......... 454/121 |
| 6,305,462 B1 | * | 10/2001 | Tsurushima et al. | .......... 165/43 |
| 6,579,167 B1 | * | 6/2003 | Demeniuk | ................... 454/126 |

* cited by examiner

Primary Examiner—Derek Boles
(74) Attorney, Agent, or Firm—Harness, Dickey & Pierce, PLC

(57) ABSTRACT

An inside/outside air switching device for a vehicle is constructed of an integrated case and a rotary door. The case has an inside port and an outside port, and a plate rib protrudes inside the case from a portion between the inside port and the outside port. The rotary door has seal members protruding toward outside from a body plate of the rotary door. A clearance is provided between a wall surface of the case and a protrusion top end of the plate rib, so that the seal members of the rotary door can be displaced from a side of the inside port to a side of the outside port through the clearance when the rotary door is assembled from the inside port into the integrated case.

11 Claims, 9 Drawing Sheets

INSIDE/OUTSIDE AIR SWITCHING DEVICE WITH ROTARY DOOR, AND VEHICLE AIR CONDITIONER USING THE SAME

CROSS REFERENCE TO RELATED APPLICATION

This application is related to Japanese Patent Application No. 2002-23867 filed on Jan. 31, 2002, the contents of which are hereby incorporated by reference.

1. Field of the Invention

The present invention relates to an inside/outside air switching device using a rotary door, for a vehicle air conditioner. More particularly, the present invention relates to an integrated inside/outside air case in which the rotary door is assembled.

2. Background of the Invention

In an air conditioner for an automotive vehicle, it has much requirement to reduce air blowing noise caused by operating the air conditioner. In this aspect, it is considered that a reduction of an air suction loss (i.e., an air suction resistance) of an air blower in the air conditioner makes an increase of an air blowing volume and a reduction of the air blowing noise. To reduce the air suction loss, an opening area of an air suction port in an inside/outside air switching device, which is located at an inlet side of the air blower, should be expanded.

For expanding the opening area of the air suction port in the inside/outside air switching device, it is proposed that a rotary door is used for the inside/outside air switching device, instead of a flat plate door.

FIGS. 11 and 12 show an inside/outside air switching device using a rotary door 126 according to a related art. In the switching device shown in FIGS. 11 and 12, it is necessary that a case 120 is divided into left and right cases 120a, 120b, when the rotary door 126 is assembled into the case 120. Further, an entire width of the rotary door 126 shown in FIG. 12 is larger than the inner width of the case 120. Therefore, the case 120 is divided into the right and left cases 120a, 120b, and the rotary door 126 is inserted between the right and left cases 120a, 120b. Accordingly, in order to obtain a sealing performance, the switching device has a complex structure due to the divided cases 120a, 120b. As a result, production cost of the switching device is increased, and the number of assembling steps for assembling the switching device is increased.

SUMMARY OF THE INVENTION

In view of the foregoing problems, it is an object of the present invention to provide an inside/outside air switching device with a rotary door for a vehicle, wherein the rotary door is readily assembled into an integrated case.

It is another object of the present invention to provide an inside/outside air switching device with a rotary door, which improves sealing performance with a simple structure.

According to the present invention, an inside/outside air switching device includes an integrated case, and a rotary door assembled into the integrated case. The case has an inside port from which air inside a passenger compartment is introduced, and an outside port from which air outside the passenger compartment is introduced. The rotary door includes a circumference wall rotatable around a rotation axis, first and second shafts provided on the rotation axis at two end sides of the circumference wall in the rotation axis, two side plates connected to the circumference wall and the first and second shafts at the two end sides of the circumference wall in the rotation axis, and a seal member disposed on peripheral surfaces of the circumference wall and the side plates. The case has therein a sealing surface protruding from a position between the inside port and the outside port to an inner side, and the sealing surface defines a first space at a side of the inside port and a second space at a side of the outside port in the case. In the inside/outside air switching device, the seal member of the rotary door is disposed to be elastically deformable and to press-contact the sealing surface, the sealing surface has an end at a side away from the inside port in the case, and the end of the sealing surface is separated from a wall surface of the case by a clearance. Further, the clearance is set to have a predetermined dimension so that the seal member of the rotary door is movable from the first space to the second space through the clearance while the rotary door is assembled into the case from the inside port. Accordingly, the rotary door can be readily assembled into the integrated case, without dividing the case into plural division case parts. As a result, air-sealing performance can be improved with a simple structure, number of assembling steps for assembling the inside/outside air switching device can be reduced, and product cost of the inside/outside air switching device can be reduced.

Preferably, a link for driving the rotary door is disposed integrally with at least the first shaft. In this case, the first shaft extends inside in the rotation axis from the side plate of the rotary door, and the first shaft has an engagement hole into which a protrusion shaft portion of the link is fitted from an outside of the first shaft. Therefore, the dimension of the rotary door in the rotation axis can be readily set smaller than an inner dimension of the case in the rotation axis, and the rotary door can be readily assembled in the integrated case.

Further, the case can have an air introduction port from which air inside the passenger compartment is introduced, and the air introduction port is provided at a position different from the inside port to be opened and closed by at least one of the side plates of the rotary door. In this case, an inside air suction area is increased in the case, and an air flowing amount in an inside air mode can be effectively increased.

When the inside/outside air switching device is used for an air conditioner of a vehicle, an air conditioning unit is disposed inside a dashboard of the vehicle at an approximate center in a vehicle width direction, and the case and the blower are disposed inside the dashboard to be offset from the air conditioning unit in the vehicle width direction to a front-passenger's seat side. In this case, the air introduction port can be provided at a side near the air conditioning unit to be opened and closed by one of the side plates of the rotary door, and the other one of side plates is provided at a side opposite to the air conditioning unit. Alternatively, the second inside port is provided at a side opposite to the air conditioning unit to be opened and closed by one of the side plates of the rotary door, and the other one of the side plates is provided at a side near the air conditioning unit.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Figure 1:
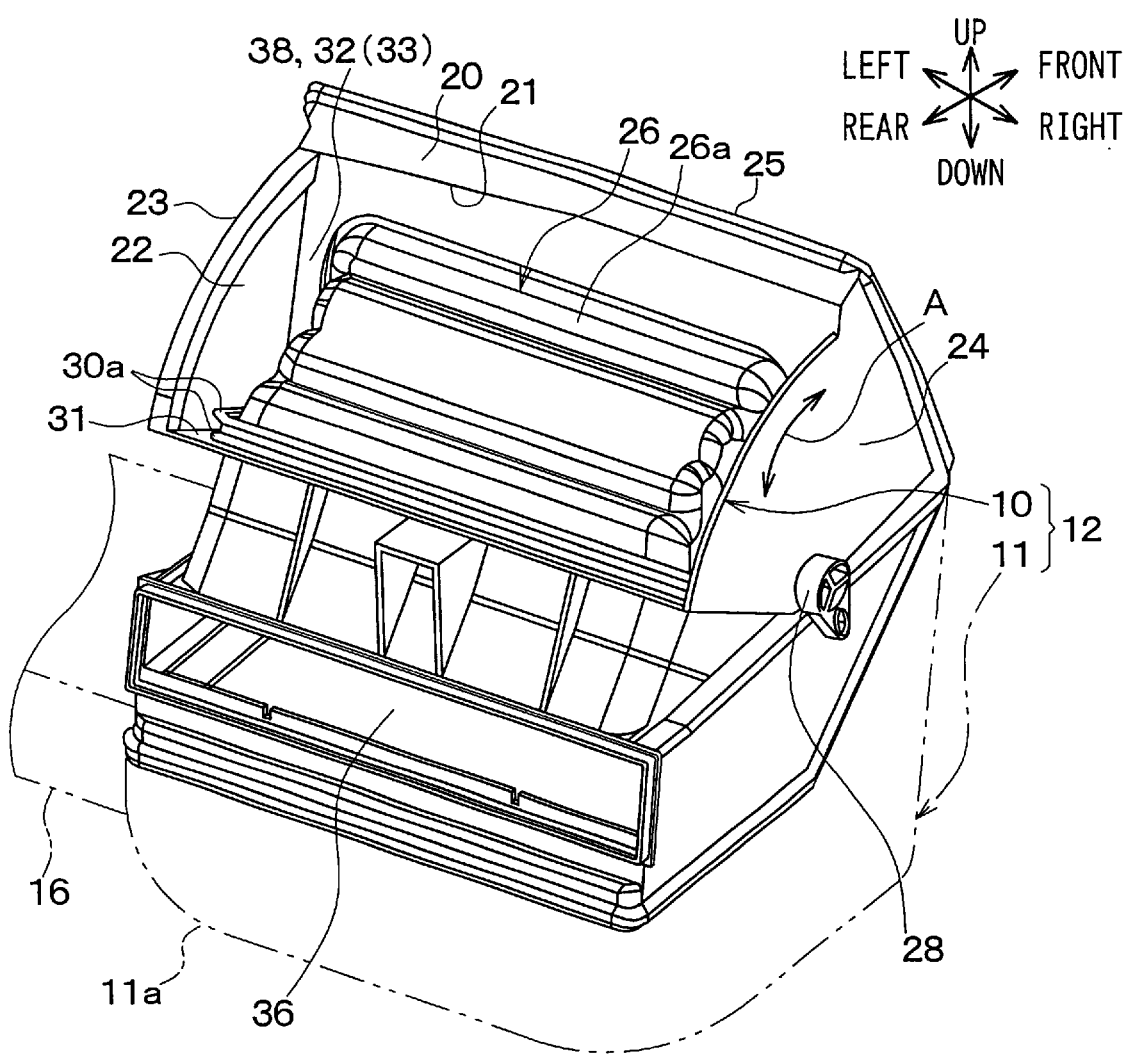
FIG. 1 is a perspective view showing an inside/outside air switching device, according to a first preferred embodiment of the present invention.
Figure 2:
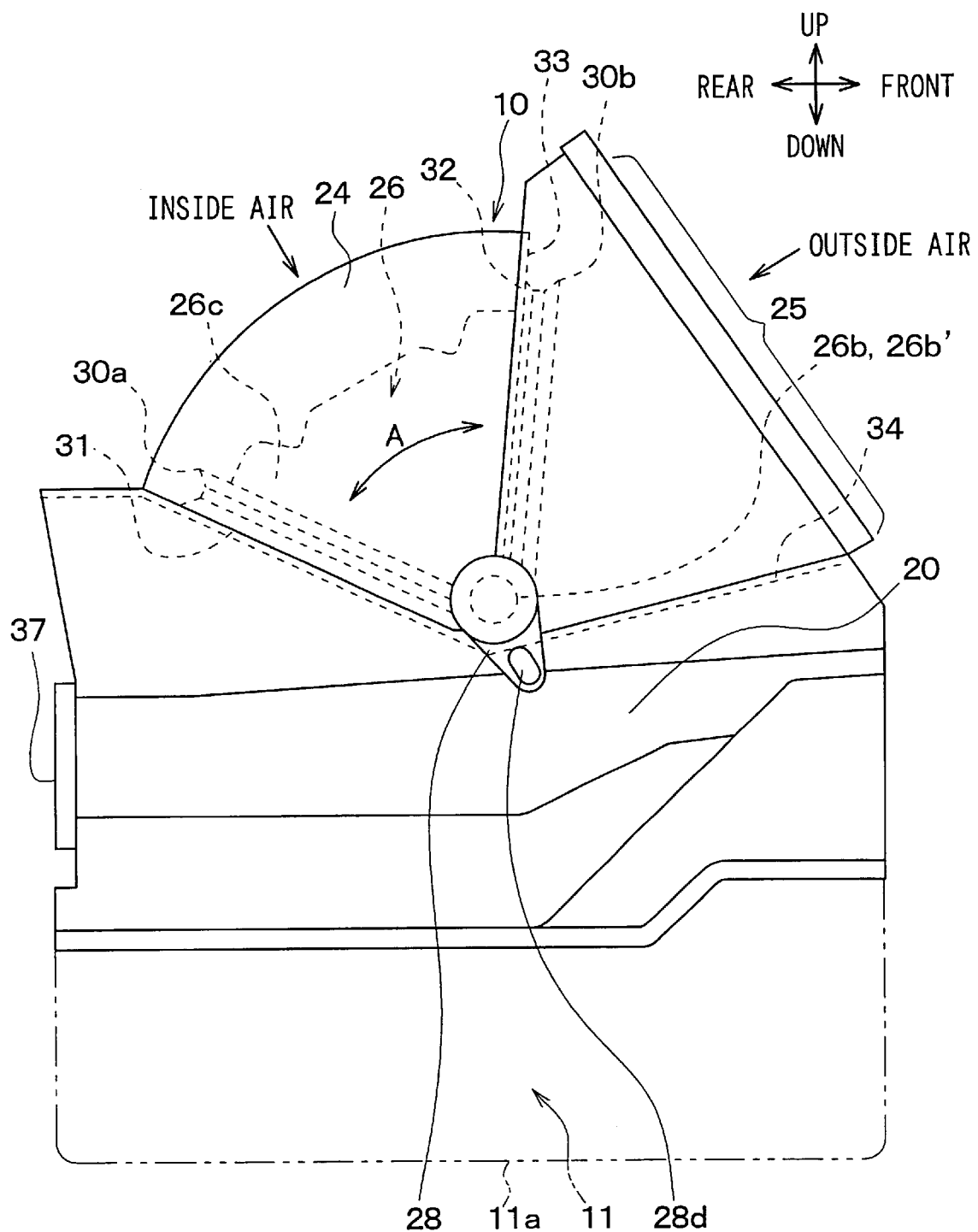
FIG. 2 is a right side view showing the switching device in FIG. 1.
Figure 3:
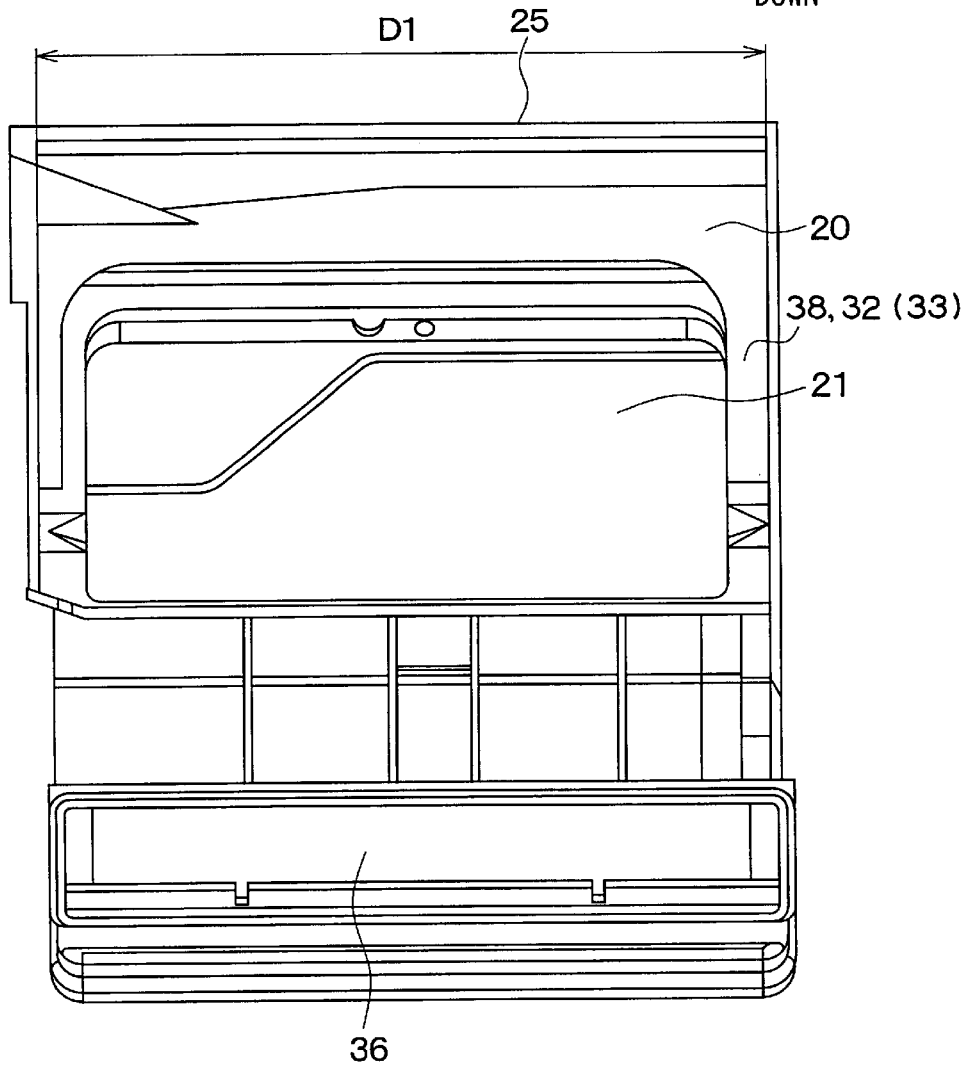
FIG. 3 is a front view showing a case of the inside/outside air switching device in FIG. 1.

A first preferred embodiment of the present invention will be described hereinafter with reference to FIGS. 1–9C. In the first embodiment, the present invention is typically applied to an air conditioner for a vehicle having a left steering wheel. FIGS. 1 and 2 show an inside/outside air switching device 10 disposed in the air conditioner. FIG. 3 shows only a case 20 of the inside/outside air switching device 10.

As shown in FIGS. 1 and 2, the switching device 10 is integrally assembled on the upper side of a centrifugal blower 11, and a blower unit 12 is constructed of the switching device 10 and the blower 11.

Figure 4:
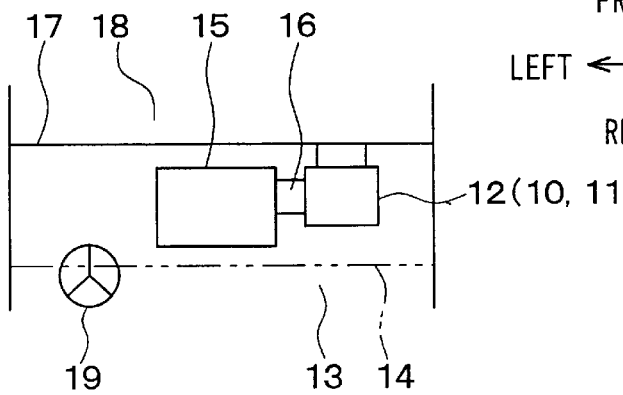
FIG. 4 is a schematic diagram showing a layout of an air conditioner in an automotive vehicle having a left steering wheel according to the first embodiment.

As shown in FIG. 4, in the vehicle having a left steering wheel, the blower unit 12, which includes the switching device 10, is disposed under an instrument panel 14 on a front-passenger's side next to a driver's side. The instrument panel 14 is located at a front side in a passenger compartment 13 of the vehicle. An air conditioning unit 15 is disposed inside the instrument panel 14 (dashboard) at an approximate lateral center of a vehicle body.

Air flows from an air outlet of a scroll casing 11a of the blower 11 into the air conditioning unit 15, through a duct 16. The air conditioning unit 15 includes a heat exchanger for cooling, another heat exchanger for heating, a temperature control unit, an inside/outside air mode selector unit, and so on. The air flowing into the air conditioning unit 15, is cooled, dehumidified, and heated, so that a temperature of the air is controlled in the air conditioning unit 15. Then, the temperature-controlled air in the air conditioning unit 15 is blown into the passenger compartment 13.

In FIG. 4, a firewall 17 is a partition between the passenger compartment 13 and an engine compartment 18. A steering wheel 19 is provided in the passenger compartment, for an automotive vehicle steering system.

The switching device 10 has a case 20 in FIGS. 1 and 2. The case 20 is integrally formed into almost a box shape by resin, which is mechanically strong and elastically deformable in some degree, such as polypropylene. A first inside port 21, from which air inside the passenger compartment 13 is introduced, is formed into a rectangular shape. The first inside port 21 is opened from the upper surface of the case 20 to the rear side of the automotive vehicle and is curved downward slantingly from the upper surface. A second inside port 22, from which air inside the passenger compartment 13 is introduced, is formed into a fan-shape, and is opened on the left surface of the case 20. The left surface of the case 20 is on the side of the air conditioning unit 15. The inside ports 21, 22 are directly opened to the passenger compartment 13, so that the inside air in the passenger compartment is sucked into the case 20 through the inside ports 21, 22. It is preferred that grids may be provided in the inside ports 21, 22 to prevent extraneous material contaminations.

In FIG. 1, a reinforcing arm 23, which is located at an upper side of the second inside port 22 and has a curved shape, is integrally formed with the case 20. A closed wall 24 is formed on the right side of the case 20. The right side of the case 20 is on the opposite side of the air conditioning unit 15.

An outside port 25 is formed in the case 20, on the front side of the automotive vehicle. The outside port 25 is opened upward slantingly and connected to an outside air passage (not shown). The outside air passage is provided to penetrate through the firewall 17, so that the outside air (i.e., the air from the outside of the passenger compartment 13) is sucked into the case 20 through the outside port 25.

Figure 5:
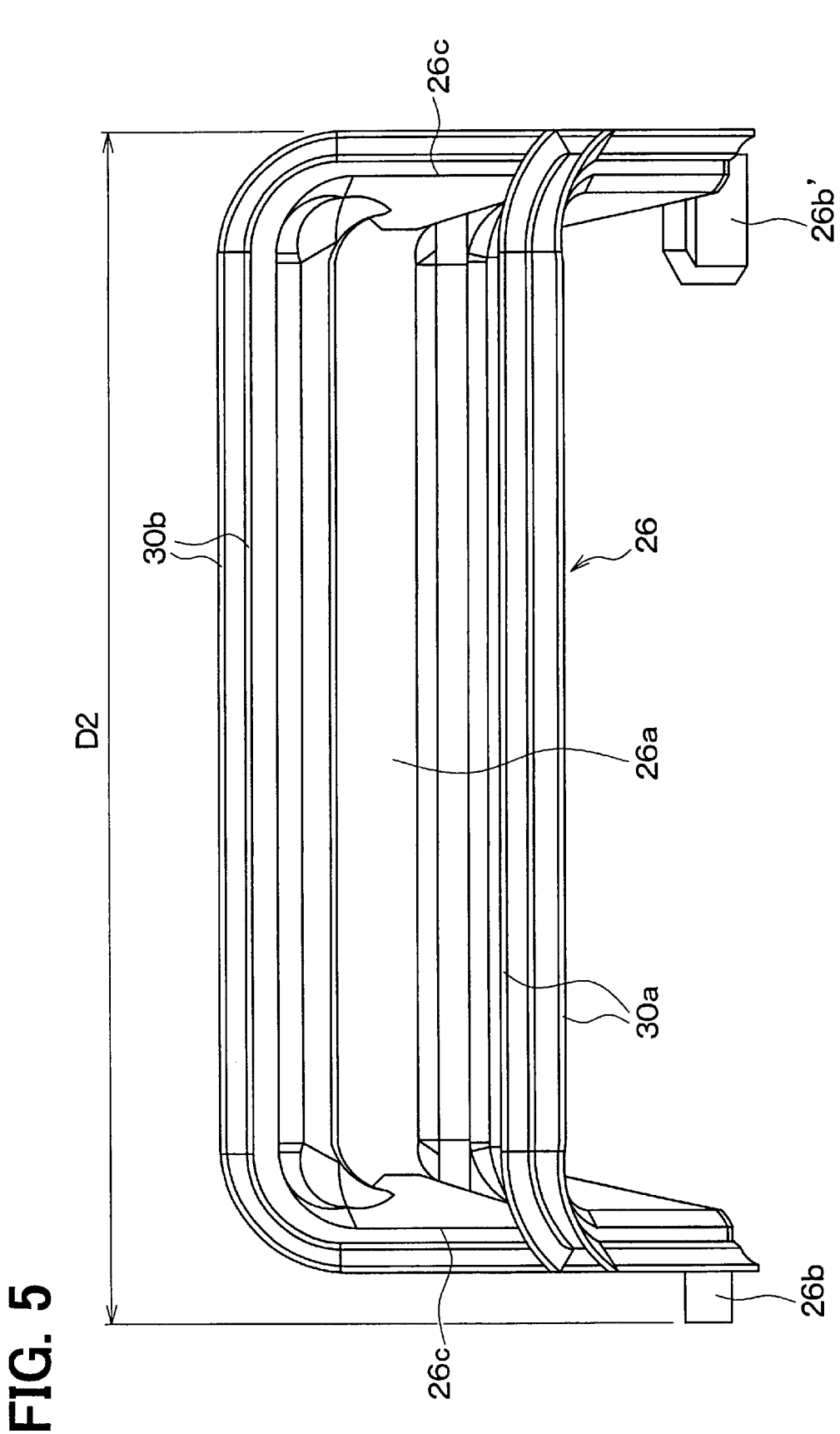
FIG. 5 is a front view showing a rotary door according to the first embodiment.
Figure 6:
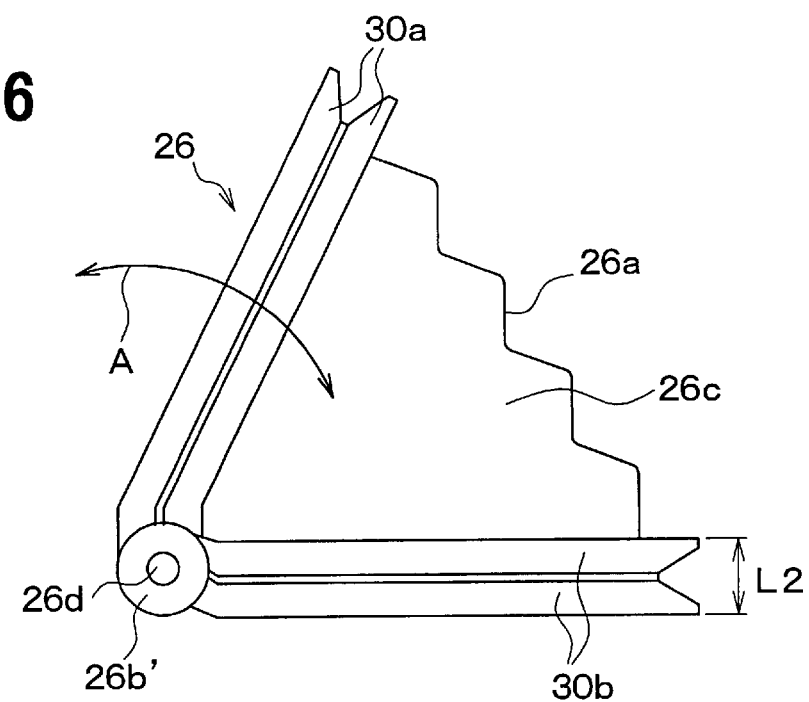
FIG. 6 is a right side view showing the rotary door in FIG. 5.

A rotary door 26 is assembled rotatably in the case 20. The rotary door 26 is disposed to open and to close the first and second inside ports 21, 22 and the outside port 25. As shown in FIG. 5 and 6, the rotary door 26 is constructed of a circumference wall 26a, two rotational shafts 26b, 26b', two side plates 26c. The circumference wall 26a extends in a rotational direction A in FIG. 6. The two shafts 26b, 26b' are located at two sides of the rotational axis of the circumference wall 26a. The two side plates 26c are formed into fan-shape and are also located at two sides of the rotational axis of the circumference wall 26a. Therefore, the circumference wall 26a, two shafts 26b, 26b' and two side plates 26c are integrated to form the rotary door 26. The rotary door 26 is made of resin, which is mechanically strong and elastically deformable, such as polypropylene.

In the case 20, the first inside port 21 and the outside port 25 are located in the rotatable range of the circumference wall 26a rotating around the rotational axis so as to be opened and to be closed by the circumference wall 26a. Further, the second inside port 22 is located in the rotatable range of the side plates 26c rotating around the rotational axis so as to be opened and to be closed by the side plates 26c. Sizes of the circumference wall 26a and the side plates 26c are set so as to be able to open and to close the first and second inside ports 21, 22 and the outside port 25.

The rotary door 26 is formed such that not only the first inside port 21 and the outside port 25, which are located around the circumference of the rotary door 26, but also the second inside port 22, which is located on the left side of the rotary door 26, are able to be opened and to be closed.

Because the rotary door 26 is used, the first and second inside ports 21, 22 are opened to form an approximate L-shape opening. Specifically, the first inside port 21 is provided to face the circumference wall 26a and the second inside port 22 is provided to face the side plate 26c that is generally perpendicular to the circumference wall 26a. This L-shape opening configuration increases the suction area of the inside air, and promotes the maximum air conditioning capacity. On the other hand, the outside port 25 has an ordinary rectangular shape.

As shown in FIGS. 1 and 5, the circumference wall 26a is composed of uneven wavelike planes. This wavelike planes prevent an air blowing noise from spreading from the inside ports 21, 22 to the passenger compartment 13 in an inside air mode. Because the wavelike planes of the circumference wall 26a restrict the air blowing noise from reflecting to the inside of the case 20, the noise is not spread to the passenger compartment 13 in the inside air mode. In the case of less requirement to prevent the air blowing noise, the circumference wall 26a may be constructed of a simple flat plane, or a circular arc surface that has a predetermined radius curvature around the axial direction of the shafts 26b, 26b'.

As shown in FIG. 5, the shafts 26b, 26b' are located at the rotational axis of the fan-shape side plates 26c positioned at two sides of the rotary door 26. The rotational axis of the side plates 26c is a pivot of the fan-shape side plates 26c. The left shaft 26b, which is located on the left side of the rotary door 26 at a position near the air conditioning unit 15, protrudes outside from the left side plate 26c, and is supported rotatably in a bearing 27 of the case 20 shown in FIG. 7. The bearing 27 is located on the left side of the case 20.

On the other hand, the right shaft 26b', which is located on the right side of the rotary door 26 to be opposite to the air conditioning unit 15 protrudes inside from the right side plate 26c. An engagement hole 26d is formed at the center in the right shaft 26b' in FIG. 8A. A protrusion shaft portion 28a of a link 28 is inserted into the engagement hole 26d, so that the right shaft 26b' and the link 28 are interlocked integrally. The engagement hole 26d and the protrusion shaft portion 28a are formed to have non-circular shapes, for example, pot-belly shapes or D-shapes, or the like. This non-circular shape enables to stop rotating and slipping the protrusion shaft portion 28a in the engagement hole 26d.

As shown in FIG. 1, the link 28 is located outside of the closed wall 24 that is on the right side of the case 20. The protrusion shaft portion 28a of the link 28 is inserted into the engagement hole 26d of the shaft 26b' through a hole (not shown) of the closed wall 24. A circular portion 28b having a circular cross-section is a root body of the protrusion shaft portion 28a. When the protrusion shaft portion 28a is fitted into the engagement hole 26d, the circular portion 28b is supported rotatably in the above-mentioned hole (not shown) of the closed wall 24.

Therefore, an entire width D2 of the rotary door 26 shown in FIG. 5 is smaller than an inner width D1 of the case 20 shown in FIG. 3. This size relationship between the width D1 ad the width D2 is achieved by forming the right shaft 26b' to be protruded toward inside from the right side plate 26c. For example, D1 is 209.7 millimeter, and D2 is 209.4 millimeter. The width of the first inside port 21 approximately has the same size as the inner width D1 of the case 20.

Figure 8A:
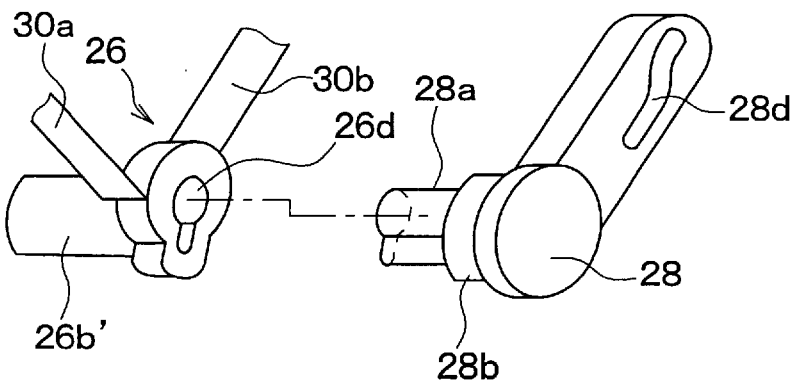
FIG. 8A is a disassemble perspective view showing a joining structure between a rotational shaft of the rotary door and a link according to the first embodiment.
Figure 8B:
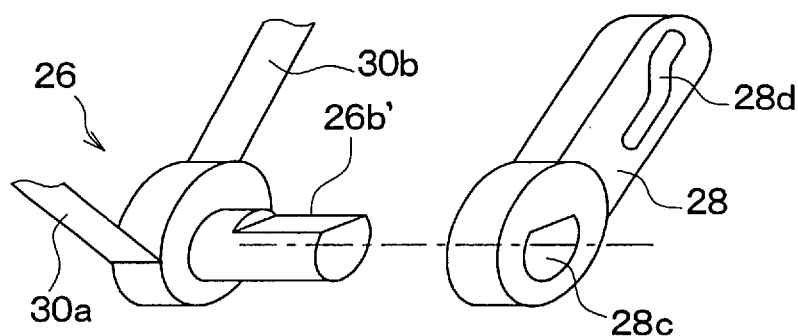
FIG. 8B is a disassemble perspective view showing a joining structure between a rotational shaft of a rotary door and a link according to a comparison example.

In a comparison example shown in FIG. 8B, the right shaft 26b' protrudes outside from the right side plate 26c, and the right shaft 26b' is inserted into an engagement hole 28c of the link 28. In this case, it is impossible to form the width D2 of the rotary door 26 to be smaller than the inner width D1 of the case 20.

As shown in FIG. 8A, the rotary door 26 is rotated by a rotational driving force transmitted from driving equipment (not shown) to the right shaft 26b' through the link 28. The link 28 has a coupling slot 28d. The coupling slot 28d is engaged with a pin of another link (not shown), which is connected to the above-mentioned driving equipment (not shown), and the pin is slidable through the coupling slot 28d. The driving equipment is, for example, constructed of an electric actuator using a servo-motor. The closed wall 24 can be used to attach the electric actuator or to support a rotational axis of the link 28. The electric actuator is operated by an inside/outside air switching signal from an automatic control of the air conditioning unit 15 or from an electric switch in the instrument panel 14. Instead of the electric actuator for the driving equipment, a manual operation lever (not shown) in the instrument panel 14 may be available for the driving equipment. In this case, the manual operation lever transmits a manual operation force to the right shaft 26b' through a cable or a link (not shown).

A sealing system in the rotary door 26 is adapted to a lip-like sealing so as to reduce a resistance for rotating the rotary door 26. As shown in FIG. 2, the rotary door 26 has seal members 30a, 30b with a thin lip-shape sealing structure. The seal members 30a, 30b are formed on a peripheral surface of a body base of the rotary door 26, such as the circumference wall 26a and the side plates 26c. The seal members 30a, 30b are made from elastomeric rubber, and formed integrally on the rotary door 26 concurrently with the resin-forming of the body base of the rotary door 26.

The seal members 30a, 30b protrude towards outside of the body base of the rotary door 26. In detail, as shown in FIGS. 5 and 6, the seal members 30a, 30b protrude toward outside of the peripheral surfaces of the circumference wall 26a and the side plate 26c. A cross-section of the seal members 30a, 30b has almost V-shape. The whole configuration of the seal members 30a, 30b has a gate shape shown in FIG. 5. The seal members 30a, 30b are formed at two side ends of the rotary door 26 in the rotational direction A of the rotary door 26 in FIG. 1.

On the other hand, inside the case 20, four sealing surfaces 31 to 34 are formed on the peripheral surfaces of the inside ports 21, 22 and the outside port 25. The ends of the seal members 30a, 30b of the rotary door 26 are elastic deformed and press-contacts the sealing surfaces 31 to 34 of the case 20.

As shown by a broken line in FIG. 2, in an outside air mode, the seal member 30a, 30b of the rotary door 26 elastically press-contact the sealing surfaces 31, 33 so that the outside port 25 is opened and the inside ports 21, 22 are closed. On the other hand, in the inside air mode, the rotary door 26 rotates clockwise from the position of the broken line in FIG. 2 so that the seal members 30a, 30b of the rotary door 26 press-contact the sealing surfaces 32, 34. Therefore, in the inside air mode, the inside ports 21, 22 are opened, and the outside port 25 is closed as shown in FIG. 9C.

Figure 7:
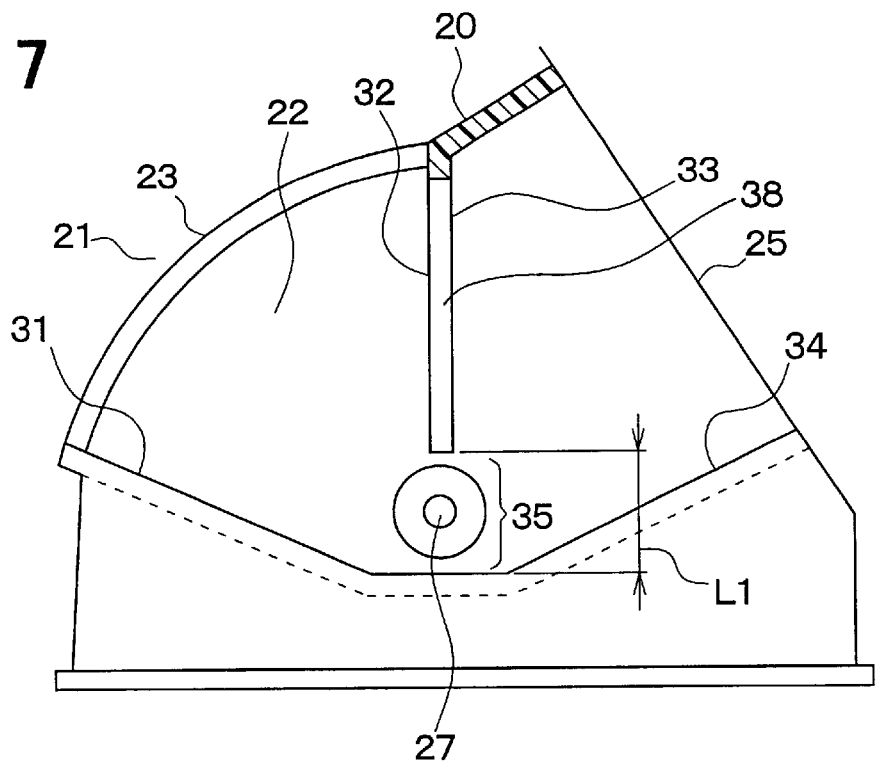
FIG. 7 is a partially cross-sectional view showing the case according to the first embodiment.

As shown in FIGS. 3 and 7, the sealing surfaces 32, 33 are formed on both front and reverse sides of a gate-shape (i.e., U-shape plate rib 38) that protrudes inside from the inner wall of the case 20 and is located at an intermediate position between the first inside port 21 and the outside port 25. Specifically, the sealing surface 32 is formed on the surface of the vehicle rear side of the plate rib 38, and the sealing surface 33 is formed on the surface of the vehicle front side of the plate rib 38. The front side of the plate rib 38 is on the side of the sealing surface 32, and the reverse side of the plate rib 38 is on the side of the sealing surface 33. The sealing surfaces 32, 33 define a first space at a side of the first inside port 21 and a second space at a side of the outside port 25 in the case 20.

Figure 9A:
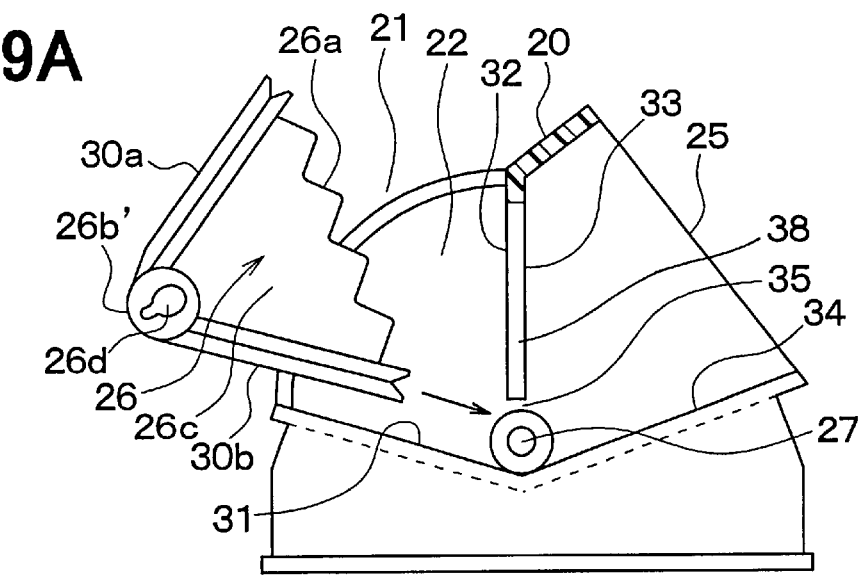
FIGS. 9A to 9C are schematic side views explaining a method for assembling the rotary door into the case according to the first embodiment.

Similarly, the sealing surfaces 31, 34 are formed into an approximate gate-shape (i.e., U-shape), which are protruded from the inner wall of the case 20 at two sides in a V-shaped ravine as shown in FIG. 9A.

As shown in FIGS. 7 and 9A, the plate rib 38 is provided to form a clearance 35 between a wall surface of the case 20 and the plate rib 38. The wall surface of the case 20 is positioned on the bottom of the V-shaped ravine formed by the sealing surface 31 and the sealing surface 34. When the rotary door 26 is assembled into the case 20, the clearance 35 enables to extrude the seal member 30b of the rotary door 26 from the vehicle rear side of the sealing surfaces 32, 33 to the vehicle front side. In other words, the seal member 30b of the rotary door 26 can be assembled to the vehicle rear side of the sealing surfaces 32, 33 from the vehicle front side thereof without being restricted by the protruded sealing surfaces 32, 33.

Further, in the first embodiment, the spacing L1 of the clearance 35 between the bottom of the V-shaped ravine of the case 20 and the plate rib 38, is larger than the width L2 of the seal member 30b shown in FIG. 6. For example, L1 is 16.1 millimeter, and L2 is 12.0 millimeter.

A method for assembling the rotary door 26 into the case 20 in this embodiment will be now described.

As shown in FIG. 9A, the rotary door 26 is inserted into the case 20 from the first inside port 21 at first, and the tip of the seal member 30b in the rotary door 26 is directed to the clearance 35. The rotary door 26 is inserted smoothly into the case 20, because the entire width D2 of the rotary door 26 is smaller than the inner width D1 of the case 20. Further, the inner width of the first inside port 21 approximately has the same size as D1.

Figure 9B:
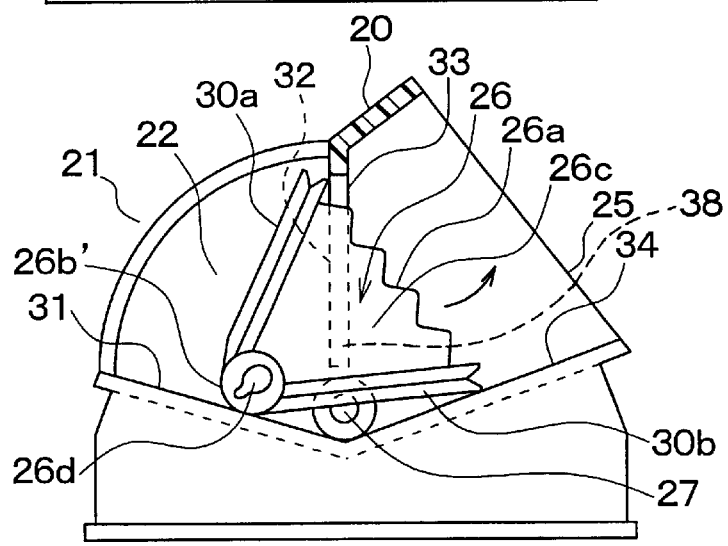
Figure 9C:
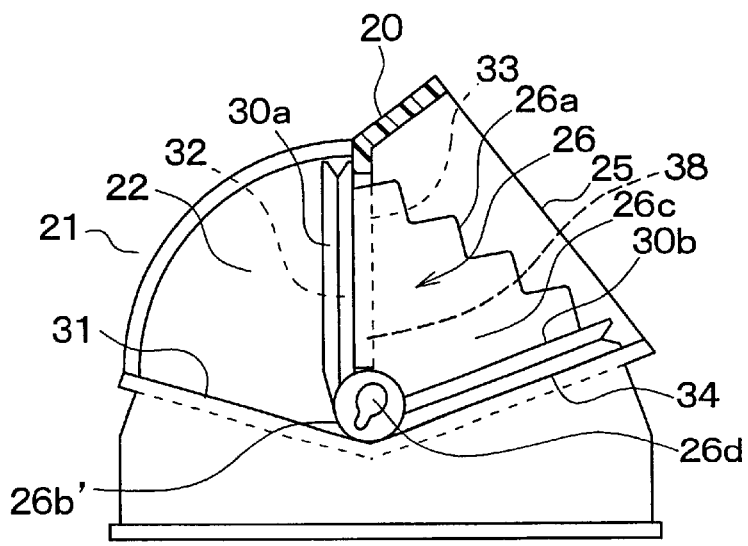
Figure 11:
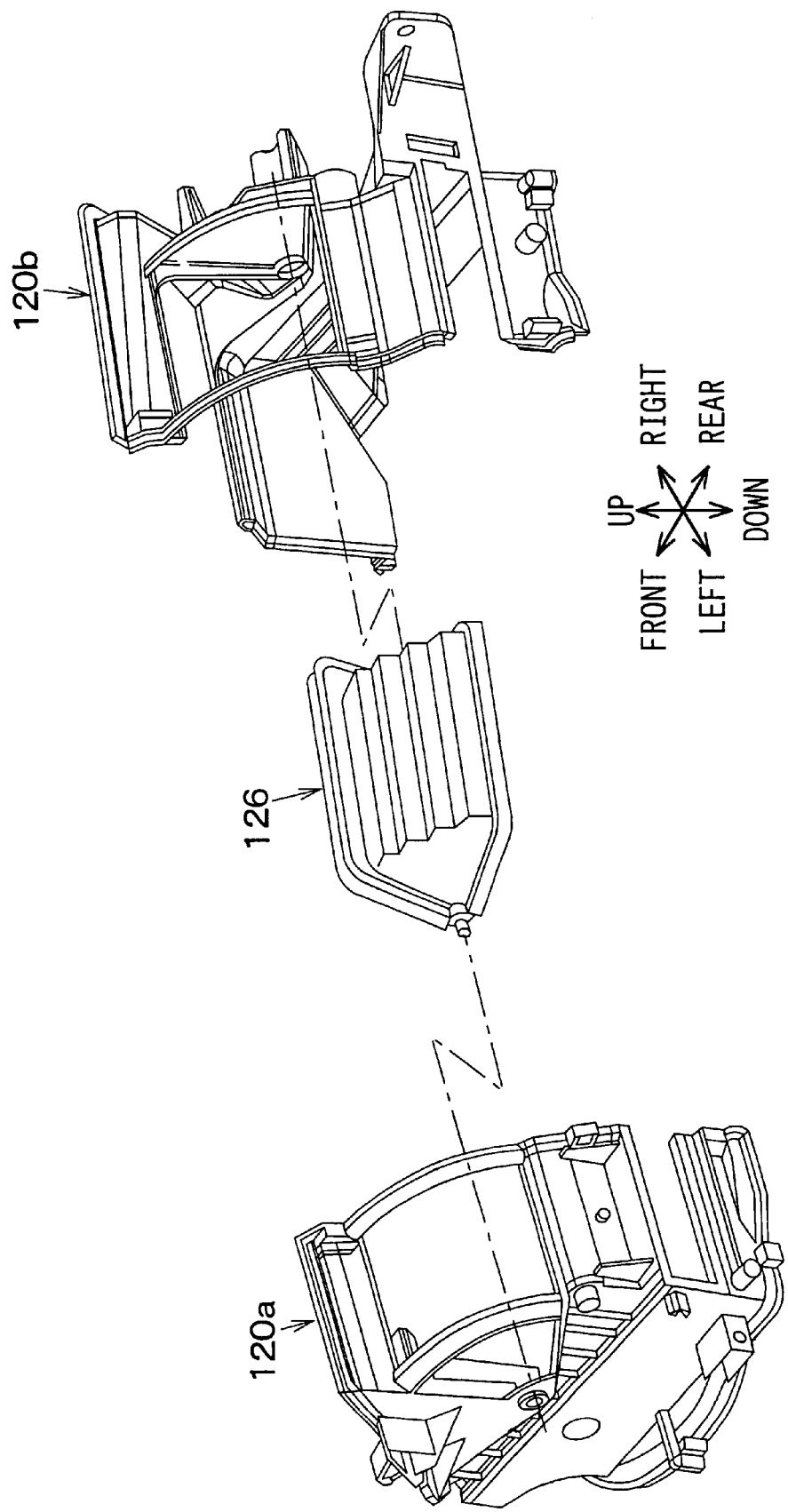
FIG. 11 is a disassemble perspective view showing an inside/outside air switching device according to a related art.
Figure 12:
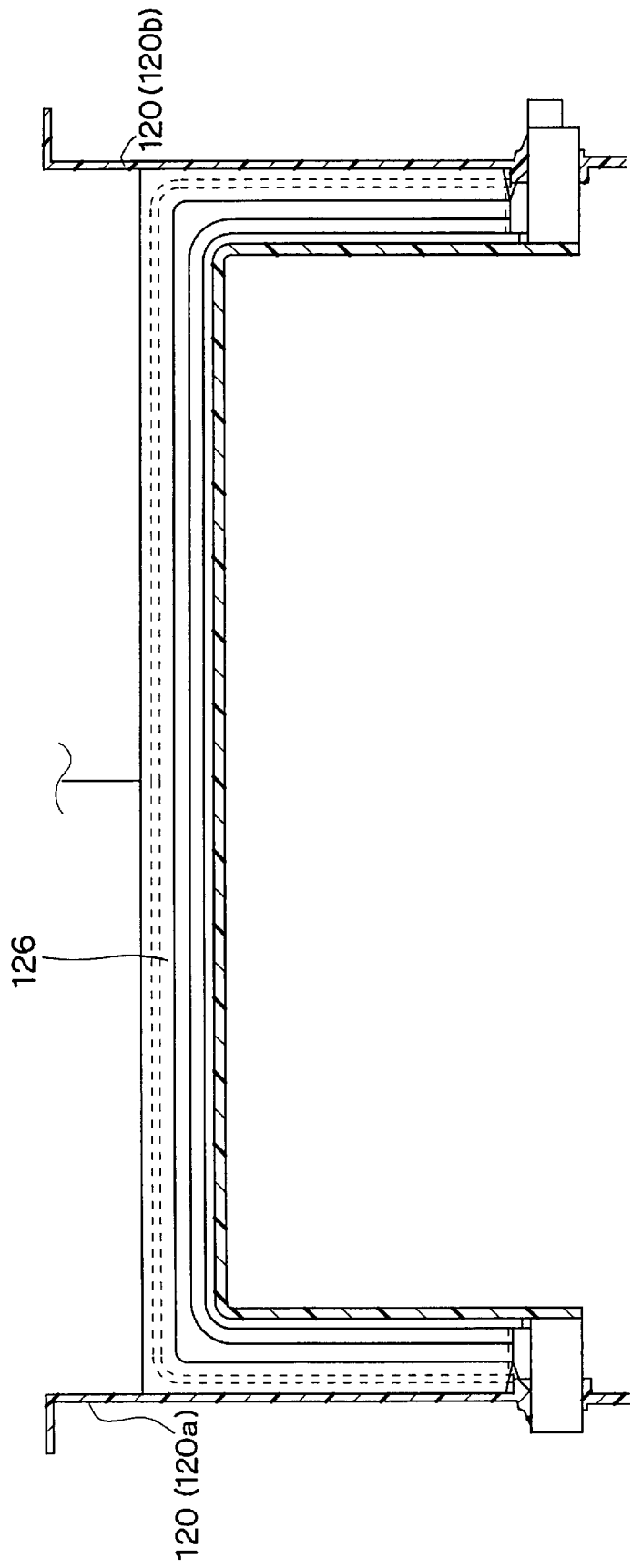
FIG. 12 is a partially cross-sectional view showing the switching device in FIG. 11.

As shown in FIG. 9B, the rotary door 26 is intruded into the side of the outside port 25, and the tip of the seal member 30b is inserted into the clearance 35, so that the seal member 30b penetrates through the clearance 35. In this way, the rotary door 26 is displaced to the vehicle front side from the sealing surfaces 32, 33.

The seal member 30b smoothly passes through the clearance 35, because the spacing L1 of the clearance 35 is sufficiently larger than the width L2 of the seal member 30b. Although the configuration of the sealing surfaces 31, 34 has V-shape, the seal member 30b is not damaged while the seal member 30b passes through the clearance 35. When the sealing surface 31 and the sealing surface 34 are aligned substantially on the same line, the spacing L1 can be set slightly larger than the width L2, not so much larger than the width L2.

Thus, the rotary door 26 is fully inserted into the case 20 shown in FIG. 9C. In this state of FIG. 9, the left shaft 26b of the rotary door 26 is inserted into the bearing 27 of the case 20. The left shaft 26b and the bearing 27 are engaged with each other, and the left shaft 26b is supported rotatably in the bearing 27.

The protrusion shaft portion 28a of the link 28 is inserted into the engagement hole 26d of the right shaft 26b'. The protrusion shaft portion 28a and the right shaft 26b' are engaged with each other, so that the rotational driving force from the above-mentioned driving equipment (not shown) is transmitted to the rotary door 26 through the link 28 and the right shaft 26b'.

As shown in FIGS. 1 and 3, an open gate 36 is used for mounting an air filter (not shown). The air filter is, for example, constructed of a resin frame and a filter material, which is formed from a corrugated-type filter paper or a porous urethane foam, or the like. The air filter is mounted in the outlet of air passage in the case 20, i.e., in the air suction side of the blower 11, and eliminates dust or odor element in the outside or inside air. In FIG. 2, a cover 37 of the air filter is attached to the case 20, after the air filter is mounted in the open gate 36.

The operation of the switching device 10 according to the first embodiment will be now explained.

Referring to FIG. 1 and 2, in the outside air mode, the seal member 30a of the rotary door 26 is elastically deformed and press-contacts the sealing surface 31 of the case 20. The seal member 30b of the rotary door 26 is also elastically deformed and press-contacts the sealing surface 33 of the case 20. Accordingly, the inside ports 21, 22 are fully closed by the circumference wall 26a and the side plate 26c, respectively. On the other hand, the rotary door 26 is released from the sealing surface 34 of the case 20, and the outside port 25 is fully opened. Then, the blower 11 sucks only the outside air from the outside port 25, and blows the outside air into the air conditioning unit 15 through the above-mentioned air filter mounted in the open gate 36.

The rotary door 26 is rotated from the position in FIG. 2 by a predetermined angle toward the vehicle front side around the shafts 26b, 26b' so that the rotary door 26 is displaced to an inside air mode position shown in FIG. 9C. In the inside air mode, the seal member 30a of the rotary door 26 is elastically deformed and press-contacts the sealing surface 32 of the case 20. The seal member 30b of the rotary door 26 is also elastically deformed and press-contacts the sealing surface 34 of the case 20. Therefore, the outside port 25 is fully closed by the circumference wall 26a. On the other hand, because the rotary door 26 is released from the sealing surface 31 of the case 20, the first and second inside ports 21, 22 are fully opened. Then, the blower 11 sucks only the inside air from the first and second inside ports 21, 22, and blows the inside air into the air conditioning unit 15 through the above-mentioned air filter in the open gate 36.

In the layout of the air conditioner in the vehicle having the left steering wheel according to the first embodiment shown in FIG. 4, the second inside port 22 is located on the left side of the switching device 10 near the air conditioning unit 15. The closed wall 24 of the case 20 is located on the right side of the switching device 10 at the opposite side of the air conditioning unit 15. The closed wall 24 is used to attach the electric actuator for the rotary door 26, to support a rotational axis of the link 28, or the like.

The first embodiment may be modified to another layout of the air conditioner for the vehicle having the left steering wheel. For example, the positions of the second inside port 22 and the closed wall 24 can be exchanged in the case 20 so that the second inside port 22 is located on the right side of the switching device 10 to be opposite to the air conditioning unit 15, and the closed wall 24 is located on the left side of the switching device 10 near the air conditioning unit 15.

Figure 10:
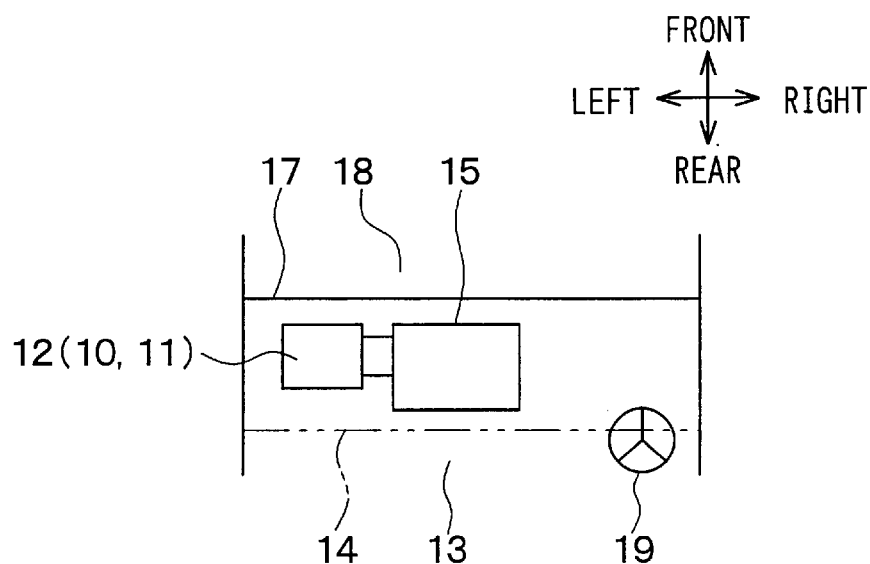
FIG. 10 is a schematic diagram showing a layout of an air conditioner in an automotive vehicle having a right steering wheel according to a second preferred embodiment of the present invention.

A second preferred embodiment of the present invention will be now described with reference to FIG. 10. In the second embodiment, the present invention is applied to an air conditioner for a vehicle having a right steering wheel. In this layout, the blower unit 12, which is composed of the inside/outside air switching device 10 and the centrifugal blower 11, is disposed inside an instrument panel 14 on the left side (i.e., the front-passenger's side next to a driver).

In the second embodiment, the switching device 10 can have the same structure as that in the first embodiment. Moreover, even in the second embodiment, there are two arrangements of the second inside suction port 22 and the closed wall 24 in the switching device 10. One is that the second inside port 22 is located on the left side of the switching device 10 (i.e., on the opposite side of the air conditioning unit 15) and the closed wall 24 is located on the right side of the switching device 10 (i.e., on the side of the air conditioning unit 15). The other is that the second inside port 22 is located on the right side of the switching device 10 (i.e., on the side of an air conditioning unit 15) and the closed wall 24 is located on the left side of the switching device 10 (i.e., on the opposite side of the air conditioning unit 15).

Although the present invention has been fully described in connection with the preferred embodiments thereof with reference to the accompanying drawings, it is to be noted that various changes and modifications will become apparent to those skilled in the art.

For example, in the above-mentioned embodiments, the second inside port 22 is formed on one side surface of the case 20, and the closed wall 24, is formed on the other side surface of the case 20. However, in the case that there is another space to attach the electric actuator for the rotary door 26 and to support a rotational axis of the link 28, at a position except for the right and left side surfaces of the case 20, the second inside port may be formed on both two sides of the case 20. This second inside port provided at both the sides of the case 20 increases the suction area of the total inside ports. Thus, the air blowing noise in the inside air mode is reduced, and the maximum air-conditioning capacity is promoted by increasing the air blowing volume.

On the other hand, the above-mentioned embodiments may be modified to a switching device that has no second inside port. In this case, the switching device has only one inside air suction port and an outside air suction port which are opened and closed by the circumference wall 26a of the rotary door 26. Moreover, the above-mentioned embodiments may be modified to another switching device that has plural inside air suction ports and plural outside air suction ports.

In the first embodiment, the entire width D2 of the rotary door 26 is set smaller than the inner width D1 of the case 20. However, the rotary door 26 is made from an elastic resin so that the rotary door 26 is deformable to some extent. Therefore, the rotary door 26 is elastically deformed by a lateral compressive force applied to the rotary door 26 so that the entire width D2 of the rotary door 26 is temporarily reduced. Thus, even when the entire width D2 is the same as or slightly larger than the inner width D1, the temporary reduction of the rotary door 26 enables to assemble the rotary door 26 into the case 20. For example, D2 is about 5 millimeter larger than D1.

Furthermore, in the first embodiment, only the right shaft 26b' is protruded toward inside from the right side plate 26c. However, the left shaft 26b may be also protruded toward inside from the left side plate 26c, similarly to the right shaft 26b'.

Such changes and modifications are to be understood as being within the scope of the present invention as defined by the appended claims.

What is claimed is:

1. An inside/outside air switching device for a vehicle comprising:

an integrated case having an inside port from which air inside a passenger compartment is introduced, and an outside port from which air outside the passenger compartment is introduced; and a rotary door for opening and closing the inside port and the outside port, the rotary door being disposed in the case, wherein:

the rotary door includes a circumference wall rotatable around a rotation axis, first and second shafts provided on the rotation axis at two end sides of the circumference wall in the rotation axis, two side plates connected to the circumference wall and the first and second shafts at the two end sides of the circumference wall in the rotation axis, a seal member disposed on peripheral surfaces of the circumference wall and the side plates;

the inside port and the outside port are provided in a rotatable range of the circumference wall;

the case has therein a sealing surface protruding from a position between the inside port and the outside port to an inner side, and the sealing surface defines a first space at a side of the inside port and a second space at a side of the outside port in the case;

the seal member of the rotary door is disposed to be elastically deformable and to press-contact the sealing surface;

the sealing surface has an end at a side away from the inside port in the case, and the end of the sealing surface is separated from a wall surface of the case by a clearance; and the clearance is set to have a predetermined dimension so that the seal member of the rotary door is movable from the first space to the second space through the clearance while the rotary door is assembled into the case from the inside port.

2. The inside/outside air switching device according to claim 1, wherein:

the case further has an air introduction port from which air inside the passenger compartment is introduced; and the air introduction port is provided at a position different from the inside port, to be opened and closed by at least one of the side plates of the rotary door.

3. The inside/outside air switching device according to claim 1, further comprising a link, integrated with the first shaft, for driving the rotary door, the link having a protrusion shaft portion, wherein:

the first shaft extends inside in the rotation axis from the side plate of the rotary door; and the first shaft has an engagement hole into which the protrusion shaft portion of the link is fitted from an outside of the first shaft.

4. The inside/outside air switching device according to claim 1, further comprising two links, integrated with the first and second shafts, for driving the rotary door, the two links having protrusion shaft portions, wherein:

the first and second shafts extend inside in the rotation axis from the side plates of the rotary door; and the first and second shafts have engagement holes into which the protrusion shaft portions of the links are fitted, respectively.

5. The inside/outside air switching device according to claim 1, wherein the rotary door has a dimension in the rotation axis, which is equal to or smaller than an inner width dimension of the case in the rotation axis.

6. The inside/outside air switching device according to claim 2, wherein:

the air introduction port is provided at a predetermined position in one side surface of the case to be opened and closed by one of the side plates of the rotary door; and the case has a closed wall at a position opposite to the predetermined position, on a side of the other one of the side plates of the rotary door.

7. The inside/outside air switching device according to claim 1, wherein:

the case includes a first wall surface that contacts the rotary door when the outside port is opened and the inside port is closed, and a second wall surface that contacts the rotary door when the outside port is closed and the inside port is opened;

the first wall surface and the second wall surface are positioned at two sides of the sealing surface, and are connected to each other through a case wall surface; and the clearance is provided between the end of the sealing surface and the case wall surface.

8. The inside/outside air switching device according to claim 1, wherein:

the case has two air introduction ports from which air inside the passenger compartment is introduced; and the two air introduction ports are provided at positions different from the inside port, to be opened and closed by the side plates, respectively.

9. An air conditioner for a vehicle, comprising:

an integrated case having first and second inside ports from which air inside a passenger compartment is introduced, and an outside port from which air outside the passenger compartment is introduced;

a rotary door for opening and closing the first and second inside ports and the outside port, the rotary door being disposed in the case;

a blower for blowing air introduced in the case;

an air conditioning unit for adjusting temperature of air blown from the blower, the air conditioning unit being disposed inside a dashboard of the vehicle at an approximate center in a vehicle width direction, wherein:

the case and the blower are disposed inside the dashboard to be offset from the air conditioning unit in the vehicle width direction to a front-passenger's seat side;

the rotary door includes a circumference wall rotatable around a rotation axis, first and second shafts provided on the rotation axis at two end sides of the circumference wall in the rotation axis, two side plates connected to the circumference wall and the first and second shafts at the two end sides of the circumference wall in the rotation axis, a seal member disposed on peripheral surfaces of the circumference wall and the side plates;

the first inside port and the outside port are provided in a rotatable range of the circumference wall;

the case has therein a sealing surface protruding from a position between the first inside port and the outside port to an inner side, and the sealing surface defines a first space at a side of the first inside port and a second space at a side of the outside port in the case;

the seal member of the rotary door is disposed to be elastically deformable and to press-contact the sealing surface;

the sealing surface has an end at a side away from the first inside port in the case, and the end of the sealing surface is separated from a wall surface of the case by a clearance; and the clearance is set to have a predetermined dimension so that the seal member of the rotary door is movable from the first space to the second space through the clearance while the rotary door is assembled into the case from the first inside port.

10. The air conditioner according to claim 9, wherein:

the second inside port is provided at a side near the air conditioning unit to be opened and closed by one of side plates of the rotary door; and the other one of side plates is provided at a side opposite to the air conditioning unit.

11. The air conditioner according to claim 9, wherein:

the second inside port is provided at a side opposite to the air conditioning unit to be opened and closed by one of the side plates of the rotary door; and the other one of the side plates is provided at a side near the air conditioning unit.

* * * * *